United States Patent [19]

Büchler

[11] Patent Number: 4,829,151
[45] Date of Patent: May 9, 1989

[54] WIRE ELECTRODE DISCHARGING MACHINE WITH A TRACER UNIT FOR WIRE POSITIONING

[75] Inventor: René Büchler, Sonnental, Switzerland

[73] Assignee: Buchler B-Set AG, Flawil, Switzerland

[21] Appl. No.: 83,755

[22] Filed: Aug. 7, 1987

[30] Foreign Application Priority Data

Aug. 8, 1986 [CH] Switzerland .................. 03181/86

[51] Int. Cl.⁴ ............................................. B23H 7/10
[52] U.S. Cl. .................................................. 219/69.12
[58] Field of Search ................. 200/61.41, 61.42; 335/285; 219/69 W, 69 M, 69 R; 204/206, 224 M

[56] References Cited

FOREIGN PATENT DOCUMENTS

| 104099 | 8/1979 | Japan | 219/69 W |
| 126025 | 7/1983 | Japan | 219/69 M |
| 221220 | 11/1985 | Japan | 219/69 W |

Primary Examiner—A. D. Pellinen
Assistant Examiner—Geoffrey S. Evans
Attorney, Agent, or Firm—Helfgott & Karas

[57] ABSTRACT

Device for the precise determination of the position of an electric discharge wire (18) in an electric discharge machining unit as a basis for the setting, control or readjustment of the electric discharge wire position with a view to a work piece machining process, with at least one contact-tracer element (24; 26; 38; 44; 46) which by means of a machining table movement is displaceable in contact with the electric discharge wire (18), whereby there is provided a tracer unit (2) equipped with at least one tracer element (24; 26; 38; 44; 46) which tracer unit with a defined position relative to a work piece (6) is attached to the work piece in a separable manner.

12 Claims, 1 Drawing Sheet

WIRE ELECTRODE DISCHARGING MACHINE WITH A TRACER UNIT FOR WIRE POSITIONING

The invention concerns a device for the precise determination of the position of an electric discharge wire in an electric discharge machining unit as a basis for the setting, control or readjustment of the electric discharge wire position with a view to a work piece machining process, with at least one contact-tracer element which is displaceable by means of a machining table movement in contact with the electron discharge wire.

In known appliances of this kind, the tracer element or elements were fixed on the machining table for the purpose of adjustment of the electric discharge wire position prior to the start of work piece machining, the position of the electric discharge wire was determined by displacement of the machining table until contact of the tracer element concerned with the electric discharge wire, whereafter on the basis of this determination, the adjustment of the electric discharge wire position was effected. This determination of position and adjustment of position was effected, if necessary, in several steps in one direction of movement of the machining table and, if necessary, for a plurality of tracer elements in a plurality of directions of movement of the machining table. Thereafter, the work piece to be machined was fixed on the machining table, and controls or readjustments of the electric discharge wire position prior to termination of the work piece machining necessitated as a rule a taking-off and subsequent renewed fixing of the work piece on the machining table. Inasmuch as the determination of the electric discharge wire position was effected relative to the machining table, the possibility of an error in fixing of the work piece adversely affecting the precision of work piece machining was also ever present.

It is the purpose of the invention to create a device of the aforeindicated kind whereby the electric discharge wire position relative to the work piece can be determined in a simpler fashion and with a lesser possibility of errors and whereby during the time prior to termination of the work piece machining, controls and, if necessary, readjustments of the electric discharge wire position in a simple manner become possible.

The device for attainment of this purpose is characterized in accordance with the invention by a tracer unit containing at least one tracer element, which unit in a defined position relative to a work piece is fixed to said work piece in a separable fashion.

In accordance with the invention, the position of the electric discharge wire in relation to the work piece to be machined is thus determined directly and thereby basically with greater precision and a control or readjustment of the electric discharge wire position becomes possible in the simplest manner even after part of the work piece machining has already been effected.

In the following, the electric discharge wire is designated in short by the term "wire". As a rule, the electric discharge wire extends in an essentially vertical position in the machine and the setting or readjustment of the electric wire location or position is obtained by adjustment of the upper and/or lower guide head of the wire in a horizontal plane.

The possibilities of embodiments of the tracer unit are particularly suitable to determine the position of a wire region, associated with a defined height in the machine, in a horizontal plane which customarily is designated as xy plane. Ordinarily, one proceeds in a manner whereby the machining table with the work piece secured on it together with the tracer unit is displaced in a first direction customarily the s called x-direction, until a tracer element and, respectively, the tracer element comes in contact with the wire. Thereafter, the wire position is determined analogously in a second, so called y-direction which normally is perpendicular to the x-direction. It is desirable that the jacket lines of the sensing cylinder extend at a right angle relative to the associated direction of displacement. If in place of two tracer cylinders a tracer ring is employed, these determinations are effected in inner peripheral points of the tracer ring which are offset (relative to each other) by about 90°.

The embodiments are particularly suitable to determine the vertical alignment of the wire or an alignment of the wire which forms a defined angle relative to the vertical.

In accordance with other measures, the tracer surface (n) of the tracer element and, respectively, of the tracer elements can be caused in an especially simple manner to assume a defined relative position with respect to certain reference surfaces of the work piece, which serves the precision and simplicity of a wire position determination.

By means of other measures, it becomes very simple to apply the tracer unit and, respectively, tracer units to the work piece and remove it or them therefrom. In most cases, the tracer unit and, respectively, the tracer elements(s) thereof will be applied only if an initial setting, control or adjustment of the wire position is to be effected and they will be removed in interim periods.

It should be stated here that in general, in case of electric discharge machining units, a precision of the wire position setting within a range (of tolerance) of only a few thousandths of a millimeter is desirable, a fact which can be complied with by means of the invention in a comparatively simple manner with the possibility of readjustment.

The invention concerns the tracer unit per se, i.e., the state thereof in which it is not fastened to the work piece in the electric discharge machining unit.

BRIEF DESCRIPTION OF THE DRAWINGS

The invention and further developments of the invention are explained in detail in the following with reference to preferred examples of embodiment represented in the drawing.

DETAILED DESCRIPTION

Figure 1:
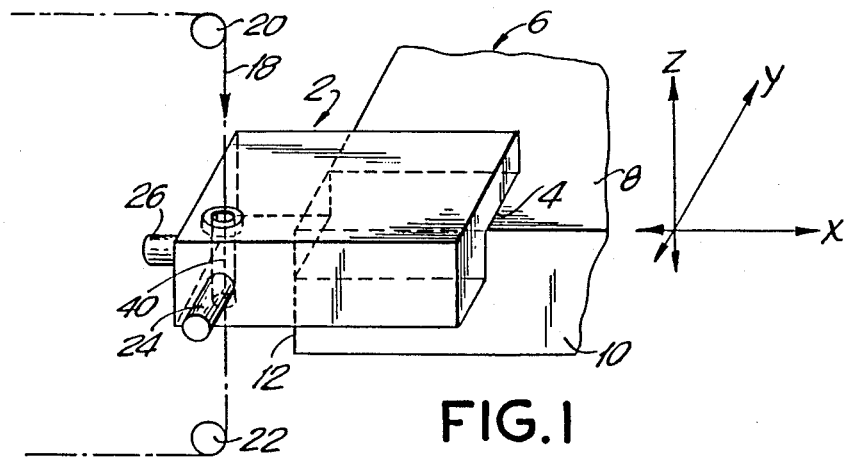
FIG. 1 shows a view in perspective of a tracer unit fastened to a work piece, whereby for the sake of simplicity, two possible designs are represented jointly for the same tracer unit.
Figure 2:
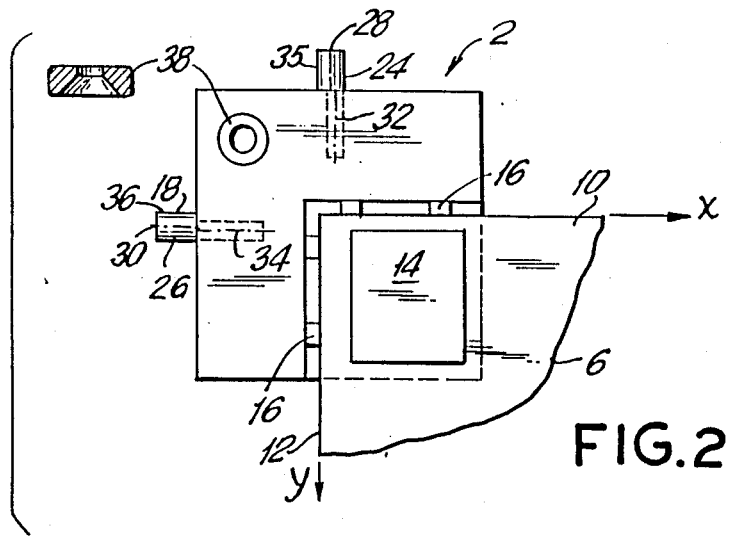
FIG. 2 is a view of the tracer unit as in FIG. 1, seen from the bottom upward.

The tracer unit -2- shown in FIGS. 1 and 2 has a body essentially in form of a rectangular prism or block with a block-shaped cavity -4- extending from one corner. The tracer unit -2- is placed with the cavity -4- on a corner region of a work piece -6- which, for reasons of clarity, is shown to be in block shape. The upper surface -8- of the work piece -6- is horizontal and extends in the xy plane of the electronic discharge machining unit. The side surfaces -10-, -12- of the work piece -6- extend at right angles relative to each other and at right angles relative to the upper surface -8-. In the surface of the cavity -4- facing the upper surface -8- of the work piece -6- is placed the plane pole surface of a magnet -14- for magnetic attachment of the tracer unit -2- to the work piece -6-, whereby distance bosses -16- on the side surfaces of the cavity -4- provide a precisely defined attachment position. The electronic discharge wire -18- of the machine is shown to extend vertically. An upper guide head -20- and a lower guide head -22- of the wire -18- are represented schematically.

From the free side surfaces of the tracer unit -2- extend outwardly a first tracer cylinder -24- and a second tracer cylinder -26-. The first tracer cylinder -24- has an axis -28- extending in the y-direction of the machine and the second tracer cylinder -26- has a longitudinal axis -30- extending in the x-direction of the machine. The first tracer cylinder is provided with an eccentric fixing shaft -32- on the tracer unit -2- (sic) and the second tracer cylinder -26- has an eccentric fixing shaft -34- on the tracer unit -2-. By rotation of the tracer cylinders -24-, -26- around the fixing shaft -32- and, respectively, -34- concerned, the pertinent perpendicular tangential surface -35- and, respectively, -36-can be caused to extend flush with the pertinent side surface -12- and -10-, respectively, of the work piece -6- or at a defined distance from the said side surfaces -12- and -10-, respectively. The tracer cylinders -24-, -26- are composed of hard metal, at least on the circumferential region serving as tracer surface. The tracer regions of the tracer cylinders -24-, -26- are insulated relative to the tracer unit -2- so that when the wire -18- is utilized as current conductor, the time of contact of the pertinent tracer cylinder -24-, -26- with the wire -18- can be determined electrically with precision.

For determination of the position of the wire -18- at the level of the tracer cylinders -24-, -26-, the machining table, not shown in the drawing, on which is fixed the work piece -6- is initially displaced in the x-direction, until the first tracer cylinder -24- with its periphery comes in contact with the wire -18-. Thereafter may be effected a desired or necessary adjustment or readjustment of the wire -18-, e.g., by displacement of the bottom guide head -22- in the x-direction. This is followed analogously by the same procedure in the y-direction with the second tracer cylinder -26-. The machine is equipped with a computer which compares the wire position values determined in the x-position and in the y-position with stored desired values.

It is possible to operate with a tracer ring -38- on the tracer unit -2- in place of the tracer cylinders -24-, -26-. The tracer ring -38- of hard metal has a bore with a vertical axis (or: shaft) which is countersunk sufficiently so that a cylindrical bore region of only two to three tenths mm remains. Displacement as far as contact between the wire -18- and the inner bore edge is effected in the x-direction and the y-direction in a manner analogous to that of the tracer cylinders -24-, -26- whereby one proceeds by preference in such a manner that displacement occurs alternatingly in the x-direction as well as the y-direction as far as the two opposite bore wall regions so that the position of the bore axis (or: shaft) results as mean value. Inasmuch as the distance of the bore axis (or: shaft) from the reference surfaces -10-, -12- of the work piece -6- is defined and known, the position of the bore axis (or: shaft) can be precisely determined with the help of the computer of the machine. The tracer ring -38- is inserted with snug fit into a corresponding countersinking of a bore -40- of the tracer unit -2-. In the event that it is desired to render the alignment of the wire -18- deviating from the vertical, the tracer ring -38- offers advantages of precision relative to the tracer cylinders -24-, -26- so that it is also possible to provide for one tracer unit -2- both forms of embodiment jointly.

Figure 3:
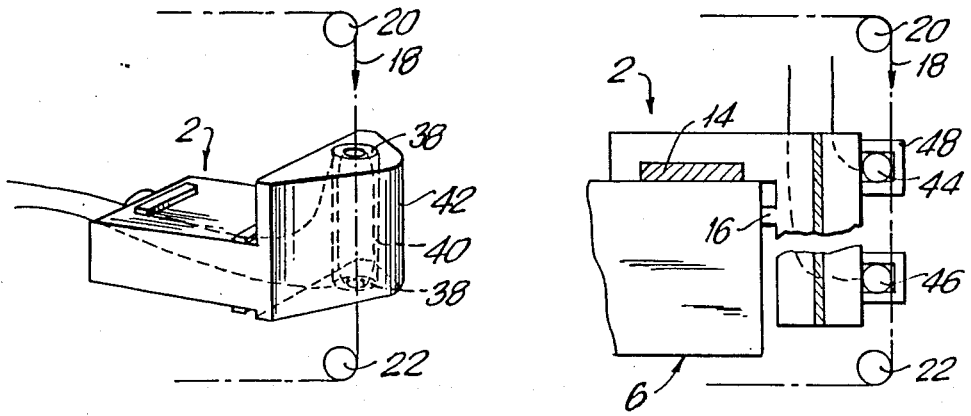
FIG. 3 shows a view in perspective of another example of an embodiment of the tracer unit.

The tracer unit -2- shown in FIG. 3 has an essentially block-shaped body with an extension -42- which is higher in the vertical direction so that a main application surface and a lateral application surface forming a right angle with the former surface, in each case with spacer bosses, are formed. The upper lateral application surface above the block-shaped region is higher than the lower lateral application surface below the block region so that thicker work pieces can be processed with the upper lateral application region and thinner work pieces with the lower lateral application region. The extension -42- is provided with a vertical bore -40- where in an upper countersinking and in a lower countersinking in each case is inserted a tracer ring -38- in a manner analogous to that of the aforedescribed form of embodiment. If the tracer unit -2- is fastened on a horizontal surface of a work piece, the wire -18- can be aligned vertically with precision. For example, the upper guide head is displaced in a horizontal plane until the upper and the lower tracer ring -38- indicate contact with the wire -18- and, respectively, indicate equal x-value, namely, meaningfully in succession (!) for the direction x and the direction y. In this manner, it also becomes possible to set a defined desired alignment of the wire -18- at an angle with the vertical.

Figure 4:
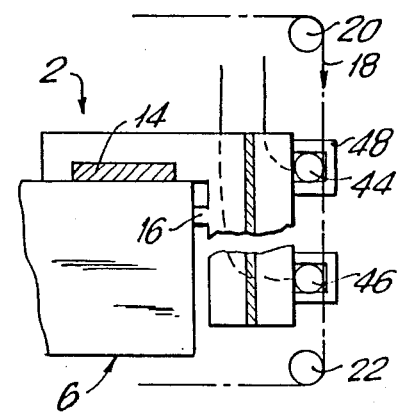
FIG. 4 a still further example of an embodiment of a tracer unit.

The tracer unit -2- according to FIG. 4 has an essentially L-shaped form. On the vertical end face of the tracer unit -2- facing away from the work piece are fastened parallelly superposed, with the help of U-shaped magnetic holders -48-, two tracer cylinders -44-, -46- with horizontal longitudinal axes. The wire -18- is aligned precisely vertically when on contact of said wire -18- with the tracer cylinders -44-, -46- equal values can be determined.

The tracers units of the embodiments shown in FIGS. 3 and 4 are likewise held magnetically on the work piece -6-whereby distance bosses -16- provide precision. To the electrical insulation of the tracer rings -38- in all examples of embodiments and the tracer cylinders -44-, -46- apply correspondingly the indications set forth in connection with the first example of an embodiment, so that contact with the wire -18- is determined electrically.

The computer of the electric discharge machining unit is programmed in a manner such that the processes of repeated displacement until contact between the tracer element and, respectively, tracer elements and the work piece as also the step-wise adjustment or readjustment of the wire position and, respectively, wire alignment are effected automatically. Likewise, introduction of the wire -18- through the tracer ring -38- or the two tracer rings -38- can be effected automatically.

I claim:

1. Device for the precise determination of the position of an electric discharge wire (18) in an electric discharge machining unit as a basis for the setting, control or readjustment of the electric discharge wire position with a view to a work piece machining process, characterized with at least one contact-tracer element (24; 26; 38; 44; 46) which by means of a machining table movement is displaceable in contact with the electric discharge wire (18) by a tracer unit (2) provided with at least one tracer element (24; 26; 38; 44; 46), said tracer unit with a defined position relative to a work piece (6) is attached to said work piece in a separable manner.

2. Device as in claim 1, characterized in that the tracer unit (2) is provided with two tracer cylinders (24, 26) arranged at an angle with respect to each other.

3. Device as in claim 2, characterized in that the axes (28, 30) of the two tracer cylinders (24, 26) are placed at least essentially in a common plane and that by preference, they form a right angle with each other.

4. Device as in claim 1, characterized in that the tracer unit (2) is provided with a tracer ring (38).

5. Device as in claim 1, characterized in that the tracer unit (2) is provided with two tracer cylinders (44, 46) which are parallelly superposed.

6. Device as in claim 1, characterized in that the tracer unit is provided with two tracer rings (38) which are parallelly superposed.

7. Device as in claim 1, characterized in that the position of the tracer surface of at least one tracer element (24; 26) is adjustable relative to the tracer unit (2).

8. Device as in claim 7, characterized in that at least one tracer cylinder (24; 26) is fastened on the tracer unit (2) and is rotatable around the eccentric fastening axis (32; 34).

9. Device as in claim 1, characterized in that the tracer unit (2) is fastened to the work piece (6) by magnetic force (14).

10. Device as in claim 1, characterized in that at least one tracer element (44; 46) is fastened on the tracer unit (2) by magnetic force (48).

11. Device as in claim 1, characterized in that the tracer element or the tracer elements (24; 26; 38; 44; 46) operate electrically.

12. Device as in claim 1, characterized in that at least the tracer surface of the tracer element or tracer elements (24; 26; 38; 44; 46) is composed of metal.

* * * * *